US008587263B2

(12) United States Patent
Yang et al.

(10) Patent No.: US 8,587,263 B2
(45) Date of Patent: Nov. 19, 2013

(54) SYSTEM AND METHOD FOR CHARGING CAPACITORS USING AUTOMATIC CELL BALANCING

(75) Inventors: Wen Yang, Singapore (SG); Yong Kok Sim, Singapore (SG); Vui Min Ho, Singapore (SG)

(73) Assignee: Linear Technology Corporation, Milpitas, CA (US)

( * ) Notice: Subject to any disclaimer, the term of this patent is extended or adjusted under 35 U.S.C. 154(b) by 77 days.

(21) Appl. No.: 13/409,992

(22) Filed: Mar. 1, 2012

(65) Prior Publication Data

US 2012/0161722 A1 Jun. 28, 2012

Related U.S. Application Data

(62) Division of application No. 12/073,924, filed on Mar. 12, 2008, now Pat. No. 8,198,869.

(51) Int. Cl.
*H02J 7/00* (2006.01)
*H02J 7/14* (2006.01)

(52) U.S. Cl.
USPC ............... 320/166; 320/155; 320/121

(58) Field of Classification Search
USPC ......... 320/166, 167, 155, 133, 121, 156, 130, 320/161, 134, 135, 136
See application file for complete search history.

(56) References Cited

U.S. PATENT DOCUMENTS

| | | | |
|---|---|---|---|
| 5,563,779 A | 10/1996 | Cave et al. | |
| 5,805,436 A * | 9/1998 | Lin | 363/60 |
| 5,828,562 A * | 10/1998 | Rivet | 363/125 |
| 6,268,710 B1 * | 7/2001 | Koga | 320/116 |
| 6,323,623 B1 * | 11/2001 | Someya et al. | 320/166 |
| 6,411,064 B1 * | 6/2002 | Brink | 320/166 |
| 6,417,649 B1 | 7/2002 | Brink | |
| 6,518,733 B1 * | 2/2003 | Schenkel et al. | 320/166 |
| 7,292,005 B2 * | 11/2007 | Pietkiewicz et al. | 320/166 |
| 7,589,504 B2 * | 9/2009 | Kobayashi et al. | 320/166 |
| 7,595,675 B2 * | 9/2009 | Boerstler et al. | 327/175 |
| 7,728,554 B2 | 6/2010 | Kim et al. | |
| 7,741,811 B2 * | 6/2010 | Daio | 320/122 |
| 2004/0130299 A1 | 7/2004 | Pietkiewicz et al. | |
| 2008/0174275 A1 * | 7/2008 | Nakao | 320/128 |
| 2008/0174280 A1 | 7/2008 | Kazuno | |
| 2008/0191795 A1 * | 8/2008 | Dharmalinggam et al. | 327/553 |
| 2009/0108815 A1 | 4/2009 | Overland et al. | |
| 2009/0174372 A1 * | 7/2009 | Maeda et al. | 320/166 |
| 2010/0019753 A1 | 1/2010 | Ikeda et al. | |

* cited by examiner

*Primary Examiner* — Edward Tso
*Assistant Examiner* — Alexis Boateng
(74) *Attorney, Agent, or Firm* — McDermott Will & Emory LLP

(57) ABSTRACT

A circuit for charging a capacitor block including series-connected capacitive elements has an input node for receiving an input, an output node coupled to the capacitor block, a third capacitive element connectable to the input node and the output node, and first and second switching circuitries coupled to the third capacitive element. A voltage sensor determines a relationship between first voltage at the first capacitive element and second voltage at the second capacitive element to separately control switching of the first and second switching circuitries in accordance with the relationship between the voltages.

23 Claims, 2 Drawing Sheets

SYSTEM AND METHOD FOR CHARGING CAPACITORS USING AUTOMATIC CELL BALANCING

RELATED APPLICATIONS

This application is a Divisional of U.S. application Ser. No. 12/073,924 filed on Mar. 12, 2008, now U.S. Pat. No. 8,198,869 the disclosures of which is incorporated by reference herein.

TECHNICAL FIELD

The subject matter of this disclosure relates to power supply circuits, and, more particularly, to circuitry and methodology for charging series-connected capacitor elements, such as supercapacitors.

BACKGROUND

Supercapacitors represent one of the latest innovations in the field of electrical energy storage, and find their place in many applications involving mass energy storage and power distribution. In comparison with classical capacitors, these new components allow a much higher energy density, together with a higher power density. Supercapacitors may be produced based on a double-layer capacitor technology to increase their charge density. However, double layer capacitors have a relatively low maximum voltage. This necessitates a series connection of supercapacitive elements or cells to support operation at higher voltages in order to reach an acceptable power conversion efficiency.

As voltages on individual double-layer capacitors depend on charges and may differ from each other, a supercapacitor system composed of series-connected capacitor cells needs a circuit for equalizing voltages on individual capacitor cells. Conventionally, voltage equalizing circuits include passive resistors or zener diodes connected in parallel to the capacitor cells. However, such circuits suffer from high power loss.

Other conventional voltage equalizing circuits use active balancing of voltages on individual capacitor cells. Active voltage balancing may be achieved using a buck/boost converter, a fly-back converter or an operational amplifier circuit. However, rather complex circuitry is required to actively balance voltages on capacitor cells.

Therefore, it would be desirable to create a simple and efficient circuit for charging series-connected capacitors so as to provide automatic voltage balancing.

SUMMARY OF THE DISCLOSURE

In accordance with the present disclosure, a circuit for charging a capacitor block having series-connected first and second capacitive elements is provided. For example, the first and second capacitive elements may be supercapacitors. The circuit comprises an input node for receiving an input, an output node coupled to the capacitor block, a third capacitive element connectable to the input node and the output node, and first and second switching circuitries coupled to the third capacitive element. A voltage sensor determines a relationship between first voltage at the first capacitive element and second voltage at the second capacitive element to separately control switching of the first and second switching circuitries in accordance with the relationship between the voltages.

In accordance with an embodiment of the disclosure, the first switching circuitry may include a first group of switching elements, and the second switching circuitry may include a second group of switching elements. An oscillator may be coupled to the switching elements to produce a first clock signal to control switching of the first group of switching elements, and a second clock signal, which may be out of phase with respect to the first clock signal, to control switching of the second group of switching elements.

For example, the voltage sensor may determine a difference between the first voltage and the second voltage to control the oscillator so as to increase the duty cycle of the first clock signal when the first voltage is less than the second voltage, and to reduce the duty cycle of the first clock signal when the first voltage is greater than the second voltage.

Alternatively, the voltage sensor may determine a ratio between the first voltage and the second voltage to control the oscillator so as to increase the duty cycle of the first clock signal if the ratio is less than a preset value and to reduce the duty cycle of the first clock signal if the ratio is greater than the preset value.

In accordance with an embodiment of the disclosure, switching elements in the first group may be closed when the first clock signal is at a first logic level, and open when the first clock signal is at a second logic level. Switching elements in the second group may be closed when the second clock signal is at the first logic level, and open when the second clock signal is at the second logic level.

A comparator may compare output voltage at the output node with a reference voltage level in order to control the oscillator so as to prevent switching elements in the first and second groups from switching when the output voltage reaches the reference voltage level.

An input current drive circuit may be coupled to the input node for controlling input current that flows from the input node so as to make the input current substantially constant in both phases of the first clock signal. The input drive circuit may comprise:

a current source, a first current mirror circuit coupled between the input node and the current source, a second current mirror circuit coupled between the input node and the third switching element, and a third current mirror circuit coupled between the input node and the first switching element.

In accordance with one embodiment of the disclosure, the first group of switches may comprise:

a first switching element coupled between the third capacitive element and the input drive circuit, and a second switching element coupled between the third capacitive element and a ground node.

The second group of switches may comprise:

a third switching element coupled between the input drive circuit and a common node between the first and second capacitive elements, a fourth switching element coupled between the third capacitive element and the output node, and a fifth switching element coupled between the third capacitive element and the common node.

In accordance with another embodiment of the disclosure, the first group of switches may comprise:

a first switching element coupled between the third capacitive element and the input drive circuit, and a second switching element coupled between the third capacitive element and a ground node.

The second group of switches may comprise:

a third switching element coupled between the input drive circuit and the third capacitive element, a fourth switching element coupled between the third capacitive element and the output node, and a fifth switching element coupled between the third capacitive element and a common node between the first and second capacitive elements.

In accordance with a method of the disclosure, a capacitive device having first and second capacitive elements connected in series is charged using a charging circuit having a third capacitive element, and first and second switching circuits. The method involves providing a first clock signal to control switching of the first switching circuit, and a second clock signal out of phase with respect to the first clock signal to control switching of the second switching circuit. The third capacitive element is charged from an input when the first switching circuit is in a first switching state and the second switching circuit is in a second switching state. The first capacitive element is charged from a charge at the third capacitive element, and the second capacitive element is charged from the input when the first switching circuit is in the second switching state and the second switching circuit is in the first switching state. A relationship between first voltage at the first capacitive element and second voltage at the second capacitive element is determined to modify the duty cycle of the first clock signal in accordance with the relationship between the voltages.

In particular, a difference between the first voltage and the second voltage may be determined to increase the duty cycle of the first clock signal when the first voltage is less than the second voltage, and decrease the duty cycle when the first voltage is greater than the second voltage.

Alternatively, a ratio between the first voltage and the second voltage may be determined to increase the duty cycle of the first clock signal if the ratio is less than a preset value and decrease the duty cycle if the ratio is greater than the preset value.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using specific examples of circuits for charging a pair of capacitors connected in series. It will become apparent, however, that the concept of the disclosure is applicable to any circuitry for charging any capacitive device having capacitors connected in series.

Figure 1:
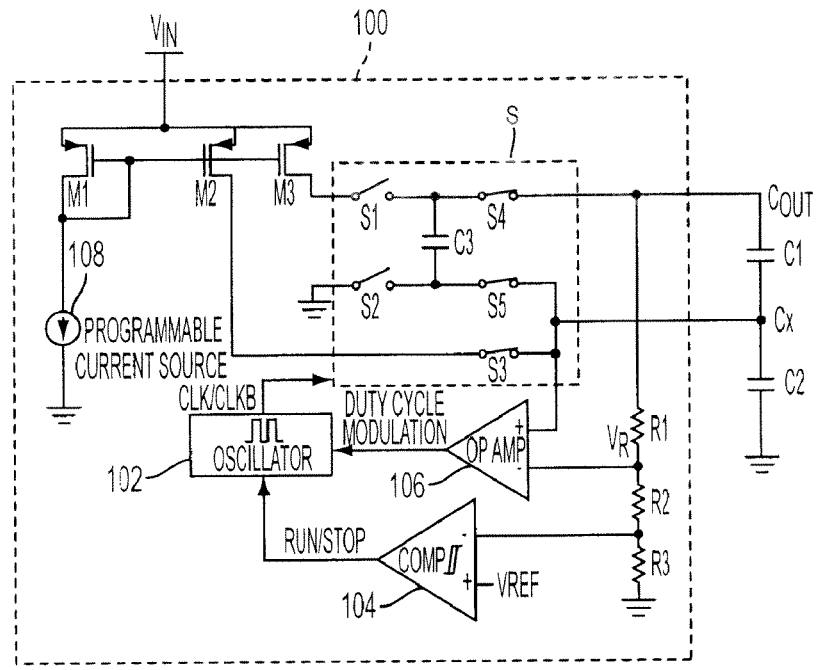
FIG. 1 shows an exemplary embodiment of the present disclosure.

FIG. 1 shows an exemplary charging circuit 100 for charging capacitors C1 and C2 connected in series. For example, capacitors C1 and C2 may be supercapacitors manufactured based on a double-layer capacitor technology. The charging circuit 100 includes an input node Vin coupled to an input power supply for receiving input voltage Vin, and an output node Cout for supplying a regulated output voltage produced from the input voltage Vin. The capacitors C1 and C2 are coupled to the output node Cout. For example, the node Cout may be connected to the capacitor C1, and the capacitor C2 may be connected in series to the capacitor C1. A common node Cx may be provided between the capacitors C1 and C2.

The charging circuit 100 may include a capacitor C3, and switches S1, S2, S3, S4 and S5 (shown in FIG. 1 as dashed line block S) coupled to the capacitor C3. An oscillator 102 generates clock signals CLK and CLKB supplied to the switches so as to control their switching. The clock signals CLK and CLKB may be digital periodic pulse waveforms produced out of phase with respect to each other. As discussed in more detail below, during brief blanking intervals, both clock signals CLK and CLKB may be at a low level.

In particular, the CLK signal may be supplied to a first group of switches including the switches S1 and S2, and the CLKB signal may be supplied to a second group of switches including the switches S3, S4 and S5. When the CLK signal is at a high level, the switches S1 and S2 are closed, and when the CLK signal is at a low level, the switches S1 and S2 are open. When the CLKB signal is at a high level, the switches S3, S4 and S5 are closed, and when the CLKB signal is at a low level, the switches S3, S4 and S5 are open.

Also, the charging circuit 100 may comprise a hysteretic comparator 104 having an output connected to the oscillator 102. The comparator 104 senses the voltage at the output node Cout and compares this voltage with reference voltage VREF that may be provided by a reference voltage source (not shown). The reference voltage VREF is selected to set a threshold level for the charging circuit 100. When the voltage at the node Cout reaches the threshold level, the output of the comparator 104 may be at a high low level to supply the oscillator 102 with a STOP signal so as to prevent the oscillator 102 from producing the clock signals CLK and CLKB to stop switching of the switches S1-S5. When the voltage at the node Cout is below the threshold voltage level, the comparator 104 may produce an output signal RUN at a low level to allow generation of the clock signals CLK and CLKB so as to enable switching of the switches S1-S5.

A resistor string composed of resistors R1, R2 and R3 may be arranged between the output node Cout and a ground node. An inverting input of the comparator 104 may be connected to a node $V_R$ between the resistors R2 and R3. The reference voltage VREF may be supplied to a non-inverting input of the comparator 104.

Further, an operational amplifier 106 is coupled to the input of the oscillator 102. The operational amplifier 106 may have a non-inverting input coupled to the common node Cx between the capacitors C1 and C2, and an inverting input coupled to a node between the resistors R1 and R2. For example, the resistance of R1 may be equal to the sum of the resistances of R2 and R3 to hold the inverting input of the amplifier 106 at a potential equal to the half of the voltage at the output node Cout in order to make voltage V1 at the capacitor C1 equal to voltage $V_2$ at the capacitor C2. Alternatively, a predetermined resistor ratio R may be selected to establish a desired voltage ratio $$\frac{V_1}{V_2} = R$$

between the voltage $V_1$ and the voltage $V_2$, where:

$$R = \frac{R_1}{R_2 + R_3},$$

and $R_1$, $R_2$ and $R_3$ are resistances of resistors R1, R2 and R3, respectively.

As discussed in more detail below, the amplifier 106 determines a relationship between the voltages $V_1$ and $V_2$ and modifies the duty cycle of the clock signal CLK accordingly. For example, when $R_1 = R_2 + R_3$, the amplifier 106 may determine a difference between $V_1$ and $V_2$ and modify the duty cycle of the CLK signal to make $V_1$ equal to $V_2$. Alternatively, when the predetermined resistor ratio R is set, the amplifier 106 may determine the voltage ratio $V_1/V_2$ and modify the duty cycle of the CLK signal to set the voltage ratio $V_1/V_2$ at a desired value R.

Also, the charging circuit 100 may include a programmable current source 108 coupled to current mirrors M1, M2 and M3 connected to the input node Vin. The current mirrors M1, M2 and M3 control the input current Iin during each phase of the clock signal CLK cycle to reduce voltage fluctuations of the input voltage Vin source that might cause noise. The current mirrors M1, M2 and M3 provide the input current Iin which is constant in both phases of the clock signal CLK cycle except for the brief blanking intervals. For example, the current mirror M1 may be provided by a field-effect transistor (FET). The current mirrors M2 and M3 may be provided by FETs having effective gate width-to-length areas that are M times the gate width-to-length areas of M1. This provides a current gain of M between M2/M3 and M1.

In the exemplary embodiment in FIG. 1, the switch S1 is connected between the current mirror M3 and the capacitor C3, the switch S2 is coupled between the capacitor C3 and a ground node, the switch S3 is connected between the current mirror M2 and the common node Cx, the switch S4 is coupled between the capacitor C3 and the output node Cout, and the switch S5 is connected between the capacitor C3 and the common node Cx.

When the switches S1 and S2 are closed and the switches S3, S4 and S5 are open, input current Iin flows from the input node Vin through the current mirror M3 and switch S1 to charge the capacitor C3. A the same time, current flows from capacitor C3 through switch S2 to ground.

When the switches S3, S4, and S5 are closed and the switches S1 and S2 are open, the input current Iin flows from the input node through the current source M2, switch S3, capacitor C3 and switch S4 to charge the output capacitors C1 and C2. Meanwhile, the charge transfer also occurs directly between the capacitor C3 and the output capacitor C1 through switches S4 and S5.

In a steady state, during each clock cycle, the charge $dQ_{3X}$ added to the capacitor C3 when the switches S1 and S2 are closed is equal to the charge transferred to the capacitor C1 from capacitor C3 when the switches S3, S4 and S5 are closed. In particular, $dQ_{3X} = dQ_{3Y} = dQ_1 = M \cdot I \cdot t_x$, where $dQ_{3Y}$ is the charge transferred from the capacitor C3 when the switches S3, S4 and S5 are closed, $dQ_1$ is the charge transferred to the capacitor C1, $t_x$ is the time period when the switches S1 and S2 are closed in each clock cycle, and M*I corresponds to the average current flowing through the current mirror M3 during the time period $t_x$ (where M is the multiplication factor of the current mirror M3, and I is the current supplied to M3).

The charge $dQ_2$ transferred to the capacitor C2 when the switches S3, S4 and S5 are closed during each clock cycle is equal to $dQ_2 = M \cdot I \cdot t_y$, where $t_y$ is the time period when the switches S3, S4 and S5 are closed in each clock cycle, and M*I correspond to the average current flowing through the current mirror M2 during the time period $t_y$ (where M is the multiplication factor of the current mirror M2, and I is the current supplied to M2).

In a steady state, the voltage $V_1$ across the capacitor C1 is equal to the voltage $V_2$ on the capacitor C2 if the resistance of R1 is equal to the sum of the resistances of R2 and R3. Also, the change $dV_1$ in the voltage across the capacitor C1 is equal to change $dV_2$ in the voltage on the capacitor C2 during each clock cycle:

$$dV_1 = \frac{dQ_1}{C_1} = dV_2 = \frac{dQ_2}{C_2},$$

where $C_1$ and $C_2$ are capacitances of the capacitors C1 and C2, respectively. Accordingly, $$\frac{t_x}{t_y} = \frac{C_1}{C_2}.$$

Hence, the ratio between the time period $t_x$ when the switches S1 and S2 are closed in each clock cycle and the time period $t_y$ when the switches S3, S4 and S5 are closed in each clock cycle is defined by the ratio between capacitances of capacitors C1 and C2.

As discussed above, the operational amplifier 106 monitors a relationship between voltages $V_1$ and $V_2$ to modify the duty cycle of the clock signal CLK that defines the ratio between time periods $t_x$ and $t_y$. As a result, a desired relationship between $V_1$ and $V_2$ may be achieved.

In particular, to make the voltage $V_1$ equal to the voltage $V_2$, the resistance of R1 may be made equal to the sum of the resistances of R2 and R3 to hold the node Cx and the inverting input of the amplifier 106 connected to this node at a potential equal to the half of the voltage at the output node Cout. When the voltage $V_1$ across the capacitor C1 is less than the voltage $V_2$ across the capacitor C2, the voltage at the node Cx becomes higher than half of the voltage at the node Cout. In response, the operational amplifier 106 produces an output signal to control the oscillator 102 so as to increase the duty cycle of the clock signal CLK. This increase in the duty cycle of the CLK signal results in the respective increase in the amount of charge $dQ_{3X}$ added to the capacitor C3 during the time period $t_x$. Therefore, the amount of charge $dQ_1 = dQ_{3Y}$ transferred from the capacitor C3 to the capacitor C1 during the time period $t_y$ also increases, while the charge $dQ_2$ transferred from the input node Vin to the capacitor C2 during $t_y$ reduces. As a result, the voltage $V_2$ increases at a slower rate than the voltage $V_1$ does until they become equal.

When the voltage $V_1$ across capacitor C1 is greater than the voltage $V_2$ across the capacitor C2, the voltage at the Cx node becomes less than half of the voltage at the node Cout. In response, the operational amplifier 106 produces an output signal to control the oscillator 102 so as to reduce the duty cycle of the CLK signal. When the duty cycle of the CLK signal is reduced, the charge $dQ_{3x}$ added to the capacitor C3 during the time period $t_x$ decreases. The charge $dQ_1=dQ_{3y}$ transferred from the capacitor C3 to the capacitor C1 during the time period $t_y$ also reduces, while the charge $dQ_2$ transferred from the input node Vin to the capacitor C2 during $t_y$ increases. As a result, the voltage $V_2$ increases at a faster rate than the voltage $V_1$ does until they become equal.

Alternatively, instead of equalizing voltages $V_1$ and $V_2$, the charging circuit 100 may establish a desired voltage ratio $$\frac{V_1}{V_2} = R.$$

In this case, resistances $R_1$, $R_2$ and $R_3$ may be selected to set $$R = \frac{R_1}{R_2 + R_3}.$$

In a steady state, the voltage ratio of the capacitors C1 and C2 is equal to R. Also, a change $dV_1$ in the voltage $V_1$ with respect to a change $dV_2$ in the voltage $V_2$ during each clock cycle is also equal to R. Since $$\frac{dV_1}{dV_2} = R = \frac{\frac{dQ_1}{C_1}}{\frac{dQ_2}{C_2}},$$

$$\frac{t_x}{t_y} = R \cdot \frac{C_1}{C_2}.$$

When the voltage ratio between $V_1$ and $V_2$ is less than the preset value R, the voltage at node Cx coupled to the non-inverting input of the operational amplifier 106 is higher than the voltage at the node $V_R$ (between resistors R1 and R2) connected to the inverting input of the amplifier 106. In response, the output of the operational amplifier 106 controls the oscillator 102 so as to increase the duty cycle of signal CLK. The increase in the duty cycle of the CLK signal results in the respective increase in the amount of charge $dQ_{3x}$ added to the capacitor C3 during the time period $t_x$. Therefore, the amount of charge $dQ_1=dQ_{3y}$ transferred from the capacitor C3 to the capacitor C1 during the time period $t_y$ also increases, while the charge $dQ_2$ transferred from the input node Vin to the capacitor C2 during the time period $t_y$ decreases. As a result, the voltage $V_2$ increases at a slower rate than the voltage $V_1$ does until their ratio $V_1/V_2$ becomes equal to R.

When the voltage ratio between $V_1$ and $V_2$ is greater than the preset value R, the voltage at the Cx pin becomes lower than the voltage at the node $V_R$. In response, the operational amplifier 106 produces an output signal to control the oscillator 102 so as to reduce the duty cycle of the CLK signal. When the duty cycle of the CLK signal is reduced, the charge $dQ_{3x}$ added to the capacitor C3 during the time period $t_x$ decreases. The charge $dQ_1=dQ_{3y}$ transferred from the capacitor C3 to the capacitor C1 during the time period $t_y$ also decreases, while the charge $dQ_2$ transferred from the input node Vin to the capacitor C2 during $t_y$ increases. As a result, the voltage $V_2$ increases at a faster rate than the voltage $V_1$ does until their ratio $V_1/V_2$ becomes equal to R.

Figure 2:
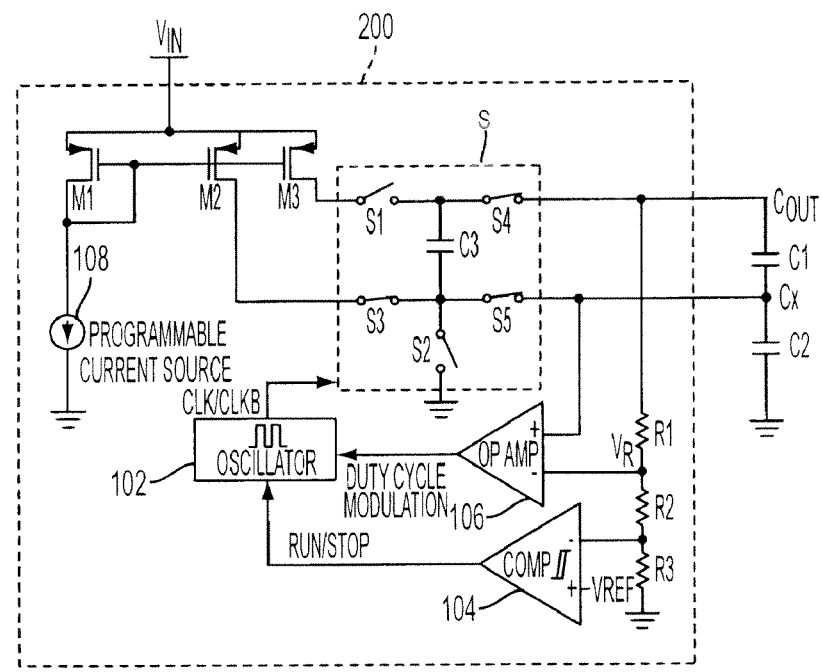
FIG. 2 shows another exemplary embodiment of the present disclosure.

FIG. 2 shows another exemplary embodiment of the present disclosure, in which a charging circuit 200 for charging series-connected capacitors C1 and C2 has elements similar to the elements of the charging circuit 100 in FIG. 1. However, in the charging circuit 200, the switch S3 is connected between the current mirror M2 and the capacitor C3, rather than between the current mirror M2 and the common node Cx, as shown in FIG. 1.

The CLK signal generated by the oscillator 102 is supplied to the switches S1 and S2 to control their switching, and the CLKB signal produced by the oscillator 102 is supplied to the switches S3, S4 and S5 to control their switching. When the CLK signal is at a high level, the switches 51 and S2 are closed, and when the CLK signal is at a low level, the switches 51 and S2 are open. When the CLKB signal is at a high level, the switches S3, S4 and S5 are closed, and when the CLKB signal is at a low level, the switches S3, S4 and S5 are open.

When the switches S1 and S2 are closed and the switches S3, S4 and S5 are open, input current Iin flows from the input node Vin through the current mirror M3 and switch S1 to charge the capacitor C3, and the current from the capacitor C3 flows through the switch S2 to ground. When the switches S3, S4 and S5 are closed, and the switches S1 and S2 are open, the input current Iin flows from the input node Vin through the current mirror M2, switch S3, capacitor C3 and switch S4 to charge the capacitors C1 and C2. At the same time, the charge transfer also occurs directly between the capacitor C3 and the capacitor C1 through the switches S4 and S5. When switches S3/S4/S5 are closed, the total current flowing through the capacitor C3 is the same as the current flowing through the capacitor C1. Also, the current in the capacitor C2 is equal to the input current Iin.

In a steady state, during each clock cycle, the charge $dQ_{3x}$ added to the capacitor C3 when the switches S1 and S2 are closed is equal to the charge transferred to the capacitor C1 from capacitor C3 when the switches S3, S4 and S5 are closed. In particular, $$dQ_{3X}=dQ_{3Y}=dQ_1=M \cdot I \cdot t_x, \text{ where}$$

$dQ_{3Y}$ is the charge transferred from the capacitor C3 when the switches S3, S4 and S5 are closed,
$dQ_1$ is the charge transferred to the capacitor C1,
$t_x$ is the time period when the switches S1 and S2 are closed in each clock cycle, and
M*I correspond to the average current flowing through the current mirror M3 during the time period $t_x$ (where M is the multiplication factor of the current mirror M3, and I is the current supplied to M3).

The charge $dQ_2$ transferred to the capacitor C2 when the switches S3, S4 and S5 are closed during each clock cycle is equal to $$dQ_2=M \cdot I \cdot t_y, \text{ where}$$

$t_y$ is the time period when the switches S3, S4 and S5 are closed in each clock cycle, and M*I correspond to the average current flowing through the current mirror M2 during the time period $t_y$ (where M is the multiplication factor of the current mirror M2, and I is the current supplied to M2).

In a steady state, the voltage $V_1$ across the capacitor C1 is equal to the voltage $V_2$ on the capacitor C2 if the resistance of R1 is equal to the sum of the resistances of R2 and R3. Also, the change $dV_1$ in the voltage across the capacitor C1 is equal to change $dV_2$ in the voltage on the capacitor C2 during each clock cycle:

$$dV_1 = \frac{dQ_1}{C_1} = dV_2 = \frac{dQ_2}{C_2},$$

where $C_1$ and $C_2$ are capacitances of the capacitors C1 and C2, respectively.
Accordingly, $$\frac{t_x}{t_y} = \frac{C_1}{C_2}.$$

Therefore, the ratio between the time period $t_x$ when the switches S1 and S2 are closed in each clock cycle and the time period $t_y$ when the switches S3, S4 and S5 are closed in each clock cycle is defined by the ratio between capacitances of capacitors C1 and C2.

The charging circuit 200 operates in the manner similar to operation of the charging circuit 100. In particular, resistances of the resistors R1, R2 and R3 may be selected to equalize voltages $V_1$ and $V_2$ across the respective capacitors C1 and C2, or to set a desired ratio between these voltages. The operational amplifier 106 monitors the relationship between the voltages $V_1$ and $V_2$ to modify the duty cycle of the clock signal CLK until the desired relationship is achieved.

Figure 3A:
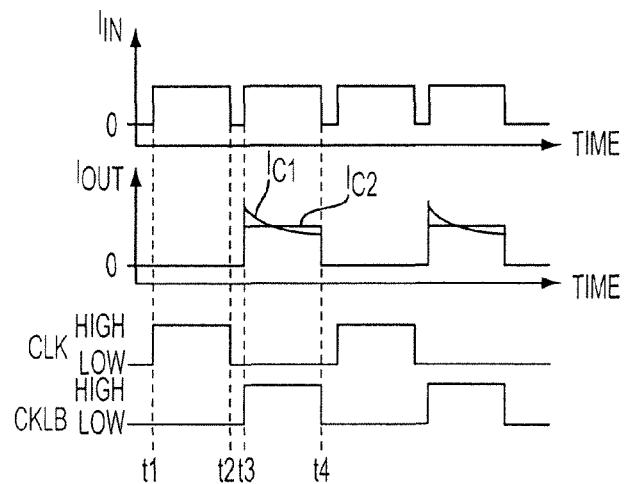
FIGS. 3(a) to 3(c) illustrate currents flowing through the capacitors being charged.
Figure 3B:
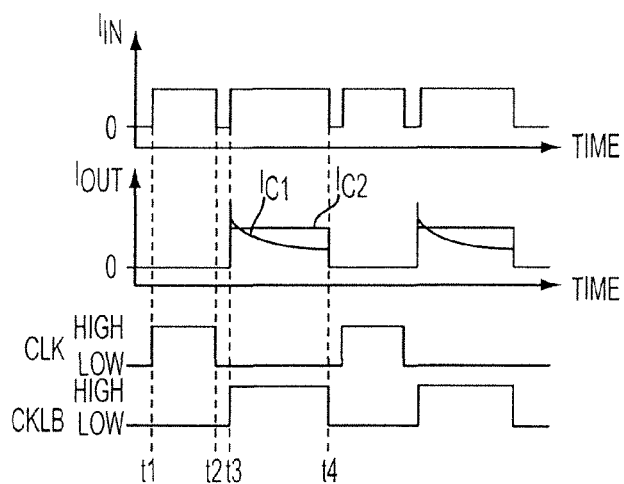
Figure 3C:
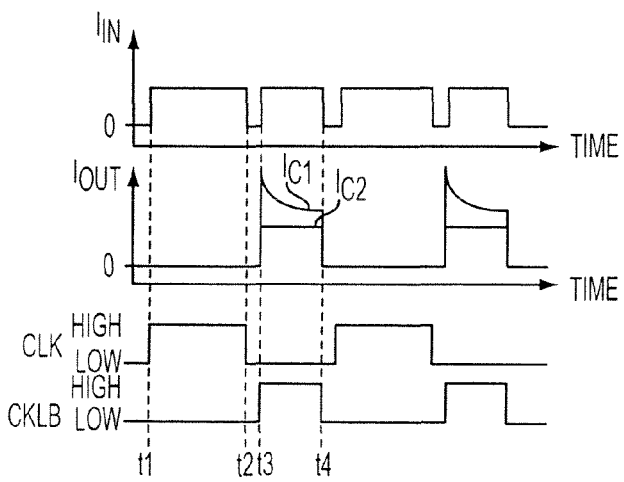

FIGS. 3a-3c show exemplary waveforms of currents $I_{C1}$ and $I_{C2}$ flowing through the capacitors C1 and C2, respectively. Also, these diagrams show current Iin flowing from the input node Vin and the current Iout flowing through the output capacitors C1 and C2. The clocks signals CLK and CLKB define time intervals $t_x$ (when the switches S1 and S2 are closed in each clock cycle) and $t_y$ (when the switches S3, S4 and S5 are closed in each clock cycle). In particular, the time interval $t_x$ corresponds to the interval between time moments t1 and t2 when the CLK signal is at a high level. The time interval $t_y$ corresponds to the interval between time moments t3 and t4 when the CLKB signal is at a high level. The clock signals CLK and CLKB are provided out of phase with respect to each other. However, brief blanking intervals may be provided in each clock cycle between the time moments t2 and t3, and between t4 and t1 when both clock signals CLK and CLKB are a low level. During the blanking intervals, all switches S1 to S5 are open to prevent short-circuiting of the input voltage Vin or the voltage across the capacitor C3 to the ground node or the output node Cout. The input current Iin is controlled so as to make it constant except for the brief blanking intervals.

FIG. 3a illustrates currents $I_{ci}$ and $I_{C2}$ flowing through the capacitors C1 and C2, respectively, when $t_x = t_y$. FIG. 3b shows the currents $I_{ci}$ and $I_{C2}$ when the time interval $t_x$ is less that the time interval $t_y$. FIG. 3c illustrates the currents $I_{ci}$ and $I_{C2}$ when the time interval $t_x$ exceeds the time interval $t_y$.

The input current Iin is equal to M*I during both time period $t_x$ and $t_y$. The current $I_{C2}$ flowing through the output capacitor C2 during time period $t_y$ is also equal to M*I. The average value of the current flowing through the output capacitor C1 during time period $t_y$ is equal to $$I_{C1} = M \cdot I \cdot \frac{t_x}{t_y}.$$

The oscillator 102 may be controlled to limit the duty cycle of the clocks signals CLK and CLKB, for example, to the interval between approximately 25% and approximately 75%. The duty cycle of the clock signals CLK and CLKB may be limited, for example, to avoid a condition where a switch is not provided sufficient time to reach its fully closed state, to avoid a condition where the current through a switch exceeds its maximum allowable current, or to avoid a condition where the capacitor current exceeds its maximum allowable current.

The clock signal CLK may remain low for an entire clock cycle of the clock signal CLKB, and clock signal CLKB may remain low for an entire clock cycle of the clock signal CLK. For example, if the capacitor C1 or C2 exhibits a behavior where it loses charge (leaks) while the other capacitor does not, it may be necessary to have nearly 100% or 0% duty cycle of the clock signals CLK and CLKB to maintain equal voltage across capacitors C1 and C2. As described above, to avoid certain conditions, small and large duty cycles of the clock signals CLK and CLKB may not be desirable. Consequently, it may be advantageous to allow either the clock signal CLK or the clock signal CLKB to remain low for an entire clock cycle of the other clock signal.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A circuit for charging a capacitor block having first and second capacitive elements connected in series, the circuit comprising:
   an input node for receiving an input,
   an output node coupled to the capacitor block,
   a third capacitive element connectable to the input node and the output node,
   first and second switching circuitries coupled to the third capacitive elements, and
   a voltage sensor for determining a relationship between first voltage at the first capacitive element and second voltage at the second capacitive element to separately control switching of the first switching circuitry and the second switching circuitry in accordance with the relationship.

2. The circuit of claim 1, further comprising an oscillator for producing a first clock signal to control switching of the first switching circuitry and for producing a second clock signal to control switching of the second switching circuitry.

3. The circuit of claim 2, wherein the voltage sensor is configured for determining a difference between the first voltage and the second voltage.

4. The circuit of claim 3, wherein the voltage sensor is configured to control the oscillator so as to increase the duty cycle of the first clock signal when the first voltage is less than the second voltage, and to reduce the duty cycle of the first clock signal when the first voltage is greater than the second voltage.

5. The circuit of claim 2, wherein the voltage sensor is configured for determining a ratio between the first voltage and the second voltage.

6. The circuit of claim 5, wherein the voltage sensor is configured to control the oscillator so as to increase the duty cycle of the first clock signal if the ratio is less than a preset value and to reduce the duty cycle of the first clock signal if the ratio is greater than the preset value.

7. The circuit of claim 2, wherein the first switching circuitry includes a first group of switching elements, and the second switching circuitry includes a second group of switching elements.

8. The circuit of claim 7, wherein switching elements in the first group are closed when the first clock signal is at a first logic level, and the switching elements in the first group are open when the first clock signal is at a second logic level.

9. The circuit of claim 8, wherein the second clock signal is out of phase with respect to the first clock signal.

10. The circuit of claim 9, wherein switching elements in the second group are closed when the second clock signal is at the first logic level, and the switching elements in the second group are open when the second clock signal is at the second logic level.

11. The circuit of claim 2, further comprising a comparator configured to compare output voltage at the output node with a reference voltage level in order to prevent the first and second switching circuitries from switching when the output voltage reaches the reference voltage level.

12. The circuit of claim 11, wherein the comparator is configured to control the oscillator.

13. The circuit of claim 7, further comprising an input drive circuit coupled to the input node for controlling input current that flows from the input node so as to make the input current substantially constant in both phases of the first clock signal.

14. The circuit of claim 13, wherein the first group of switching elements comprises:
a first switching element coupled between the third capacitive element and the input drive circuit, and
a second switching element coupled between the third capacitive element and a ground node.

15. The circuit of claim 14, wherein the second group of switching elements comprises:
a third switching element coupled between the input drive circuit and a common node between the first and second capacitive elements,
a fourth switching element coupled between the third capacitive element and the output node, and
a fifth switching element coupled between the third capacitive element and the common node.

16. The circuit of claim 15, wherein the input drive circuit comprises:
a current source,
a first current mirror circuit coupled between the input node and the current source,
a second current mirror circuit coupled between the input node and the third switching element, and
a third current mirror circuit coupled between the input node and the first switching element.

17. The circuit of claim 13, wherein the first group of switching elements comprises:
a first switching element coupled between the third capacitive element and the input drive circuit, and
a second switching element coupled between the third capacitive element and a ground node.

18. The circuit of claim 17, wherein the second group of switching elements comprises:
a third switching element coupled between the input drive circuit and the third capacitive element,
a fourth switching element coupled between the third capacitive element and the output node, and
a fifth switching element coupled between the third capacitive element and a common node between the first and second capacitive elements.

19. The circuit of claim 18, wherein the input drive circuit comprises:
a current source,
a first current mirror circuit coupled between the input node and the current source,
a second current mirror circuit coupled between the input node and the third switching element, and
a third current mirror circuit coupled between the input node and the first switching element.

20. The circuit of claim 2, wherein the oscillator is controlled to limit a duty cycle of the first and second clock signals to a predetermined range.

21. The circuit of claim 2, wherein the oscillator is controlled to limit a duty cycle of the first and second clock signals to a range from approximately 25% to approximately 75%.

22. The circuit of claim 2, wherein the oscillator is controlled to disable the second clock signal during an entire clock cycle of the first clock signal.

23. The circuit of claim 1, wherein the first and second capacitive elements are supercapacitors.

* * * * *